(12) United States Patent
Rao et al.

(10) Patent No.: US 11,809,857 B2
(45) Date of Patent: Nov. 7, 2023

(54) LIVE FIRMWARE UPDATE SWITCHOVER

(71) Applicant: TEXAS INSTRUMENTS INCORPORATED, Dallas, TX (US)

(72) Inventors: Sira Parasurama Rao, Richmond, TX (US); Baskaran Chidambaram, Tamil Nadu (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/692,670

(22) Filed: Mar. 11, 2022

(65) Prior Publication Data

US 2023/0289175 A1 Sep. 14, 2023

(51) Int. Cl.
*G06F 8/656* (2018.01)
*G06F 9/26* (2006.01)
*G06F 8/71* (2018.01)
*G06F 8/658* (2018.01)

(52) U.S. Cl.
CPC .............. *G06F 8/656* (2018.02); *G06F 8/658* (2018.02); *G06F 8/71* (2013.01); *G06F 9/268* (2013.01)

(58) Field of Classification Search
CPC . G06F 8/656; G06F 8/658; G06F 8/71; G06F 9/26

USPC ........................................................ 717/168
See application file for complete search history.

(56) References Cited

U.S. PATENT DOCUMENTS

| | | | |
|---|---|---|---|
| 7,962,736 B1 | 6/2011 | Polyudov | |
| 2016/0266894 A1* | 9/2016 | Panicker | G06F 8/656 |
| 2020/0073580 A1* | 3/2020 | Frolikov | G06F 9/4401 |
| 2021/0011706 A1 | 1/2021 | Nachimuthu et al. | |

OTHER PUBLICATIONS

"Serial Port", Wikipedia, https://en.wikipedia.org/w/index.php?title=Serial_port&oldid=1073577424, Feb. 23, 2022, 10 pgs.

* cited by examiner

*Primary Examiner* — John Q Chavis
(74) *Attorney, Agent, or Firm* — Mandy Barsilai Fernandez; Frank D. Cimino

(57) ABSTRACT

A method includes receiving, by a microcontroller, a live firmware update (LFU) command from an external host; and downloading, by the microcontroller, an image of a new version of firmware responsive to the LFU command. During a first time period, the method includes initializing only variables contained in the new version that are not contained in an old version of firmware. During a second time period, the method includes updating one or more of an interrupt vector table, a function pointer, and/or a stack pointer responsive to the new version. The second time period begins responsive to completing initialization of the variables.

20 Claims, 4 Drawing Sheets

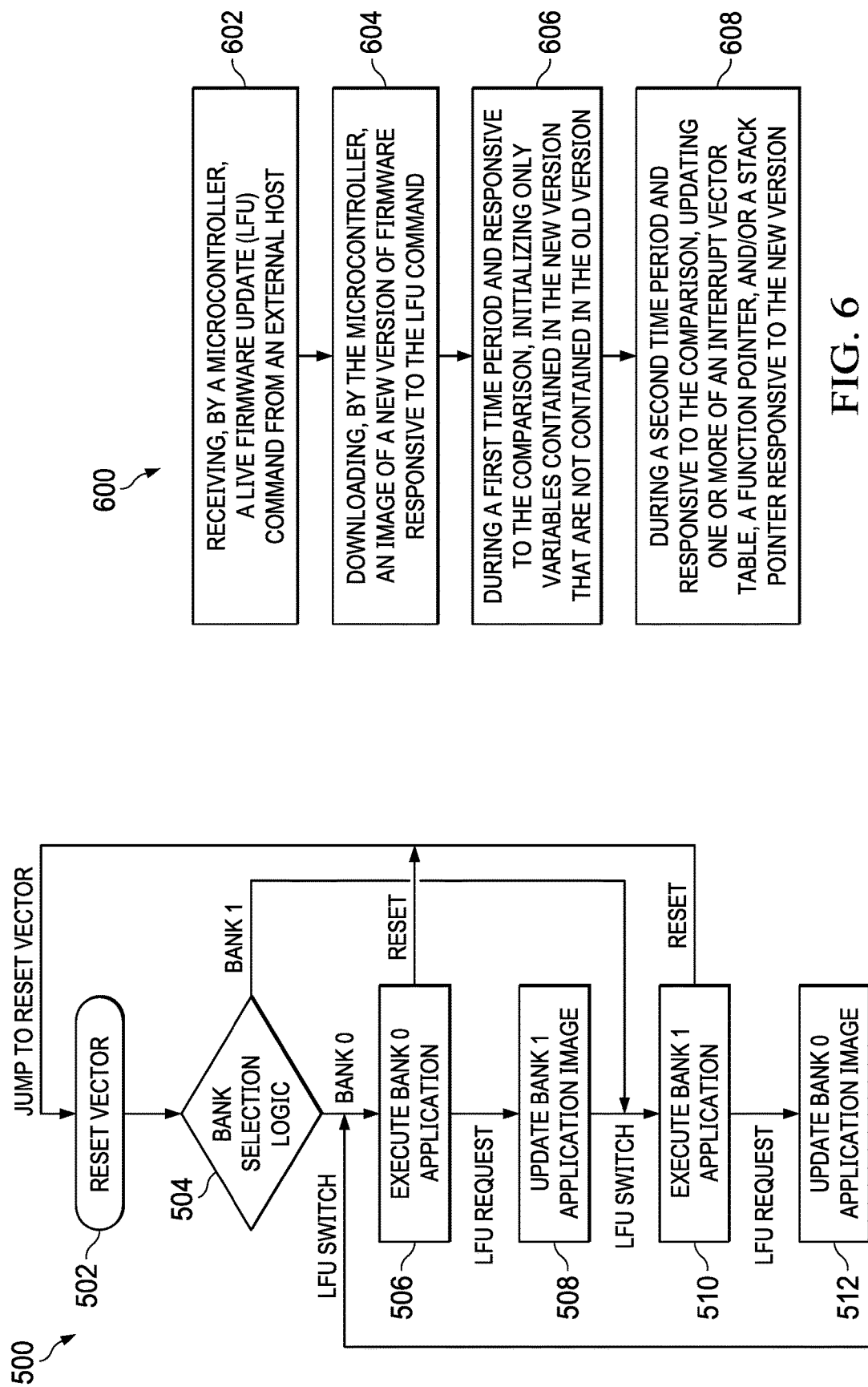

LIVE FIRMWARE UPDATE SWITCHOVER

SUMMARY

In one example of the disclosure, a method includes receiving, by a microcontroller, a live firmware update (LFU) command from an external host; and downloading, by the microcontroller, an image of a new version of firmware responsive to the LFU command. During a first time period, the method includes initializing only variables contained in the new version that are not contained in an old version of firmware. During a second time period, the method includes updating one or more of an interrupt vector table, a function pointer, and/or a stack pointer responsive to the new version. The second time period begins responsive to completing initialization of the variables.

In another example of the disclosure, a device includes a memory configured to store instructions, and a processor coupled to the memory and configured to execute the instructions. The processor executing the instructions causes the device to be configured to receive a live firmware update (LFU) command from an external host, and download an image of a new version of firmware responsive to the LFU command. During a first time period, the processor executing the instructions causes the device to be configured to initialize only variables contained in the new version that are not contained in an old version of firmware. During a second time period, the processor executing the instructions causes the device to be configured to update one or more of an interrupt vector table, a function pointer, and/or a stack pointer responsive to the new version. The second time period begins responsive to completing initialization of the variables.

In yet another example of the disclosure, a device includes a processor, a first flash memory coupled to the processor, and a second flash memory coupled to the processor. The first flash memory includes a first application storage portion configured to store a first version of firmware, and the second flash memory includes a second application storage portion. The processor is configured to receive a live firmware update (LFU) command from an external host, and download an image of a second version of firmware responsive to the LFU command, where the second version is newer than the first version. During a first time period, the processor is configured to initialize only variables contained in the second version that are not contained in the first version. During a second time period, the processor is configured to update one or more of an interrupt vector table, a function pointer, and/or a stack pointer responsive to the second version. The processor is also configured to program the second application storage portion with the second version of firmware, responsive to the first application storage portion storing the first version of firmware. The second time period begins responsive to completing initialization of the variables.

BRIEF DESCRIPTION OF THE DRAWINGS

For a detailed description of various examples, reference will now be made to the accompanying drawings in which:

FIG. 5 is a flow diagram of a method to prepare for a live firmware update in accordance with various examples; and FIG. 6 is a flow diagram of a method for a live firmware update switchover in accordance with various examples.

DETAILED DESCRIPTION

Figure 1:
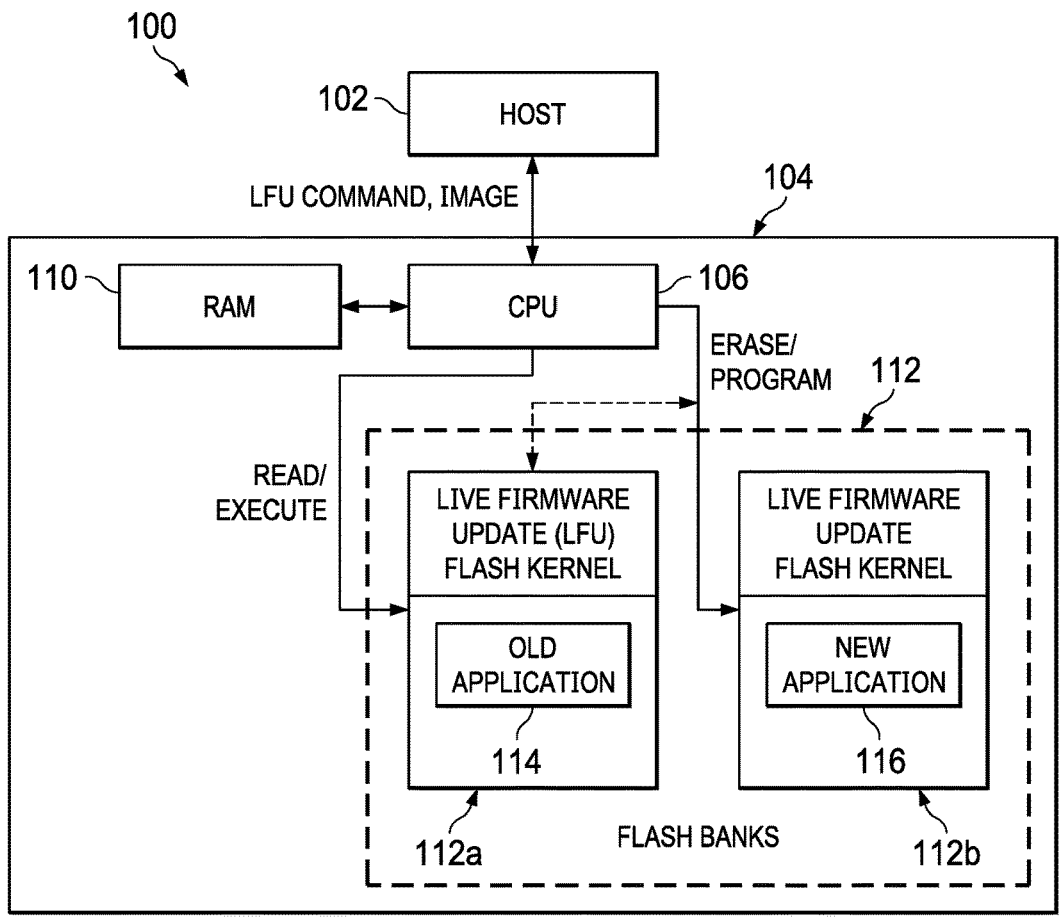
FIG. 1 is a schematic block diagram of a computer system configured for live firmware updates in accordance with various examples.

A high-availability system is a computer system that satisfies a maximum downtime requirement, such as a number of minutes per day that the computer system can be offline. Some high-availability systems are required to be available twenty-four hours a day, seven days a week. Irrespective of whether a small amount of downtime or no downtime at all is tolerable, it is useful to perform maintenance of the high-availability system such that the system downtime requirement is satisfied. Examples of high-availability systems include telecommunications servers, and server power supply units (PSUs).

A live firmware update (LFU) is one kind of maintenance that is performed on high-availability systems to update an old version of firmware to a new version of firmware. The firmware can also be referred to at times as an application, or application firmware for simplicity. An LFU switchover refers to the process of updating the old version of the firmware to the new version of the firmware. In some cases, an extent or a magnitude of firmware changes (e.g., a delta or difference between an old firmware version and a new firmware version, such as new variables to be initialized, number of new function pointers, and the like) during the LFU switchover is limited by a duration of an idle window between interrupt service routine (ISR) windows (e.g., known or predetermined periods of time in which interrupts can be serviced).

In one example, interrupts occur at a rate of 200 kHz, or once every 5 microseconds (us), with a 40% duty cycle, so the ISR can occupy 2 us of the 5 us period. Accordingly, the duration of the idle window is the 3 us per cycle after the 2 us allocated for the ISR. In some cases, the LFU switchover is constrained to (e.g., needs to be completed during) the 3 us idle window before the next interrupt can occur, and thus the magnitude of changes implemented by the LFU is constrained by the duration of the idle window.

Examples of this description addresses the foregoing by providing a microcontroller that implements a two-step LFU switchover process. The two-step LFU switchover takes advantage of assumption(s) that can be made regarding the initialization of variables to allow interrupts to continue to be serviced during at least a portion of the LFU switchover (e.g., during the first step, which occupies a greater duration of the overall LFU switchover process).

For example, a compiler facilitates the LFU (e.g., by providing a firmware image corresponding to a new version of firmware), and the compiler is LFU-aware in some examples. Accordingly, the compiler is provided with source file(s) for the new version of firmware, as well as source file(s) and/or a firmware image of the old version of the firmware as a reference. The compiler is thus able to identify commonalities (e.g., common data variables), as well as differences (e.g., new data variables) between the old version of the firmware and the new version of the firmware specified in the source file(s). For example, a variable used in the old version of the firmware that is also used in the new version of the firmware (e.g., a common data variable) does not need to be initialized or allocated to a new location in memory. A variable used in the old version of the firmware that is not used in the new version of the firmware can be de-allocated or deleted responsive to the new version of the firmware beginning to service interrupts (e.g., to avoid disrupting the ability of the old version to service interrupts). Finally, a variable not used in the old version of the firmware that is used in the new version of the firmware (e.g., a new data variable) needs to be allocated and initialized during the LFU.

Examples of this description leverage an assumption that common variables (e.g., from an old version of the firmware to a new version of the firmware) do not need to be reinitialized during an LFU switchover. These common variables remain in the same memory (e.g., random-access memory (RAM)) address, preserving the state of the variable. Examples of this description leverage another assumption that new variables (e.g., not present in the old version of the firmware, but present in the new version of the firmware) need to be initialized during the LFU switchover.

In the first step of the LFU switchover process, initializations occur that can be performed while continuing to service interrupts. For example, in the first step of the LFU switchover, new variables are initialized, while common variables are not altered (e.g., common variables are not re-initialized), and variables not used in the new version of the firmware are not yet de-allocated.

In the second step of the LFU switchover, software initializations occur that cannot be performed while also servicing interrupts. For example, interrupt vector tables (e.g., containing location(s) in memory at which the ISR(s) reside) can be updated while interrupts are disabled. Likewise, function pointers (e.g., location(s) in memory at which the functions being pointed to reside) can be updated while interrupts are disabled. Further, stack pointer(s) can also be initialized while interrupts are disabled. Accordingly, when the second step of the LFU switchover is complete, an execution context of the old version of the firmware is cleared or reset to enable an execution context of the new version of the firmware to begin following the second step of the LFU switchover. Because the first step of the LFU switchover can entail multiple memory accesses, the duration of the first step scales with the number of variables to be initialized and is generally much greater than the duration of the second step. For example, the first step can be on the order of 100s of cycles, while the second step can be on the order of 10s of cycles, or less than 10 cycles.

The first step of the LFU switchover can be considered to implement functionality that does not impact the ability of the old version of the firmware to service interrupts. For example, the changes made during the first step are related to initializing variables for the new version of the firmware, and also do not alter variables used by the old version of the firmware, and thus do not impact the ability of the old version of the firmware to service interrupts. Accordingly, during the first step of the LFU switchover, interrupts remain enabled and interrupts can thus be serviced by the old version of the firmware. For example, if an interrupt occurs during the first step of the LFU switchover, the initialization of variables pauses while the ISR of the old version of the firmware executes and, upon completion of the ISR, control is transferred back to the initialization process. Because the first step does not reinitialize any common variables (e.g., variables used in both the old version of the firmware and the new version of the firmware), the first step can occur independently of continuing to service interrupts generated by the old version of the firmware. Further, any new variables created (e.g., initialized) during the LFU switchover will not be accessed by ISRs from the old version of the firmware.

The second step of the LFU switchover changes aspects of the system context (e.g., interrupt vector tables) that would cause an ISR from the old version of the firmware not to function properly. Accordingly, during the second step of the LFU switchover, interrupts are disabled (e.g., interrupts are latched) and are provided to the microcontroller responsive to the second step being completed, and interrupts thus being re-enabled. In one example, the second step of the LFU switchover begins responsive to an end of an ISR window (e.g., at the beginning of an idle window), and completes prior to the end of the idle window in which the second step begins. Accordingly, an interrupt that occurs in a subsequent ISR window (e.g., that follows the idle window in which the second step begins) is serviced by an ISR from the new, updated firmware.

This enables LFUs to be implemented without having their magnitude constrained by the duration of the idle window present in the high-availability system. In particular, because the first step of the LFU switchover is the dominant step from a time/duration perspective, it is useful to free the first step from the timing constraint of needing to be performed within the idle window between ISR windows. These and other examples are described more fully below, with reference made to the accompanying figures.

FIG. 1 is a schematic block diagram of a computer system 100 configured to implement an LFU in accordance with various examples. In the example of FIG. 1, the system 100 includes a host application 102 (also referred to as host 102 for simplicity) that is coupled to a target device 104. In some examples, the host application 102 is executed on a computing device separate from, but coupled to, the target device 104. For example, the host application 102 can be executed on a desktop computer, a laptop computer, a tablet computer, or the like. The host application 102 is configured to communicate with the target device 104, such as over a communication peripheral or channel (e.g., serial communication interface (SCI), universal asynchronous receiver-transmitter (UART) interface, inter-integrated circuit (I2C) interface, or the like).

The host 102 is configured to issue LFU commands and provide firmware (e.g., a firmware image corresponding to a new version of firmware) to the target device 104. In the examples of this description, the firmware image provided to the target device 104 is LFU-compatible. Accordingly, the target device 104 is configured to receive the firmware image from the host 102, to update an old version of firmware to the new version of the firmware, and subsequently execute the new version of the firmware.

Figure 2:
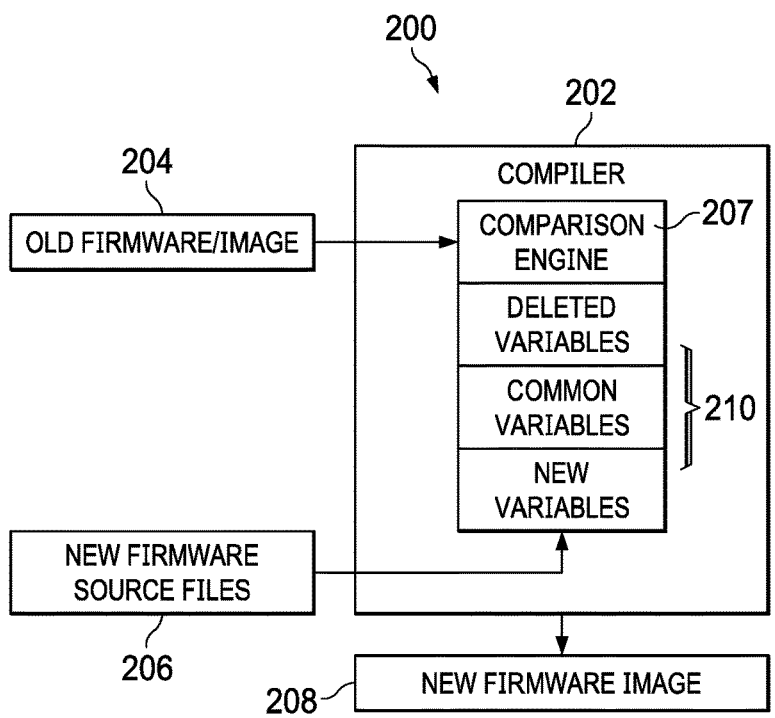
FIG. 2 is a schematic block diagram of a compiler configured to provide a firmware image for a live firmware update in accordance with various examples.

In an example, the firmware image corresponding to the new version of the firmware is provided to the host 102 by a compiler. FIG. 2 is a schematic block diagram 200 of a compiler 202 configured to provide a firmware image for a LFU switchover in accordance with various examples. As described above, the compiler 202 is LFU-aware and is provided with source file(s) and/or a firmware image of an old version of firmware 204, as well as source file(s) for the new version of firmware 206 as a reference. The compiler 202 is configured to provide a firmware image 208 corresponding to the new version of the firmware, as described further below.

The compiler 202 is configured to facilitate the LFU switchover. As described above, the compiler 202 is configured to identify commonalities (e.g., common data variables), as well as differences (e.g., new data variables) between the old version of the firmware 204 and the new version of the firmware 206 specified in the image(s) or source file(s).

For example, a comparison engine 207 of the compiler 202 is configured to identify a variable used in the old version of the firmware 204 that is also used in the new version of the firmware 206, which does not need to be initialized or allocated to a new location in memory. The comparison engine 207 is also configured to identify a variable used in the old version of the firmware 204 that is not used in the new version of the firmware 206, which can be de-allocated responsive to the new version of the firmware beginning to service interrupts (e.g., to avoid disrupting the ability of the old version to service interrupts). Finally, the comparison engine 207 is also configured to identify a variable not used in the old version of the firmware 204 that is used in the new version of the firmware 206, which needs to be allocated and initialized during the LFU switchover. The compiler 202 is thus configured to compare the new version 206 with the old version 204 to determine common variables (e.g., present in both the old version 204 and the new version 206), and to determine new variables (e.g., present in the new version 206, but not in the old version 204). The compiler 202 provides the determined variables 210 as an output of the compiler 202 in some examples As described above, examples of this description leverage an assumption that common variables do not need to be reinitialized during an LFU switchover. These common variables remain in the same memory address, preserving the state of the variable. Examples of this description leverage another assumption that new variables need to be initialized by the compiler 202 to provide the firmware image 208 corresponding to the new version of the firmware.

For example, a first (e.g., earliest in time) version of firmware uses variables A, B, and C; a second version (e.g., later in time than the first version) of firmware uses variables B, C, and D; and a third version (e.g., later in time than the second version) of firmware uses variables B, C, and E. Accordingly, when facilitating a first LFU switchover from the first version to the second version, the comparison engine 207 of the compiler 202 identifies B and C as common variables, and thus the compiler 202 does not reinitialize B or C during the first LFU switchover (e.g., in the firmware image 208). The comparison engine 207 of the compiler 202 identifies D as a new variable for the first LFU switchover, and thus the compiler 202 allocates and initializes D during the first LFU switchover (e.g., in the firmware image 208). However, because A can still be used by ISRs of the first version of firmware during the first LFU switchover, the compiler 202 is configured not to allocate the location where A resides for any new variables of the first LFU switchover.

Subsequently, when facilitating a second LFU switchover from the second version to the third version, the comparison engine 207 of the compiler 202 identifies B and C as common variables, and thus the compiler 202 does not reinitialize B or C during the second LFU switchover (e.g., in the resulting firmware image 208). Further, the comparison engine 207 of the compiler 202 identifies E as a new variable for the second LFU switchover, and thus the compiler 202 allocates and initializes E during the second LFU switchover (e.g. in the resulting firmware image 208). In this example, the location where A resides can be allocated to E, because A is not used by the second version (e.g., the old version for the second LFU switchover) of the firmware, but the location where D resides cannot be allocated to E, because D can still be used by ISRs of the second version of firmware during the second LFU switchover. Of course, other locations than those where A and D reside can be allocated to E; the foregoing is one example of compiler behavior to preserve variables from the old version of firmware relative to the current LFU switchover so that ISRs of the old version of firmware can still be implemented during the LFU switchover to continue to service interrupts.

Referring again to FIG. 1, the target device 104 includes a hardware processor 106, such as a central processing unit (CPU) 106 or the like. In an example, the target device 104 is implemented in a real-time digital power application, in which an output voltage is regulated to a particular value even responsive to changes in an output load. In another example, the target device 104 is implemented in another application in which real-time data processing is useful. In yet another example, the target device 104 is implemented in an application for which a high-availability system is useful, as described above. Regardless of the particular application, the CPU 106 is configured to provide various processing functionality to support the application in which the target device 104 is implemented. The CPU 106 is also configured to receive and process LFU commands from the host 102. The CPU 106 is also configured to receive firmware images (e.g., firmware) from the host 102 and to facilitate execution of the firmware images, such as by providing the firmware images to one or more flash banks, which are described further below.

In some examples, the target device 104 includes one or more types of memory, such as random-access memory (RAM) 110 and flash memory 112. In the example of FIG. 1, the flash memory 112 includes a first flash bank 112a and a second flash bank 112b. However, in other examples, the flash memory 112 can include more or fewer banks than the two shown in FIG. 1.

In general, the RAM 110 is coupled to, and thus readable and writable by, the CPU 106. The RAM 110 is useful to store data variables for access by the CPU 106, such as when executing various programs to provide functionality of the target device 104.

In the example of FIG. 1, the flash memory 112 is coupled to, and thus readable and writable by, the CPU 106. The flash memory 112 is configured to store firmware, such as for execution by the CPU 106. As described further below, by providing physically separate flash banks 112a, 112b, LFUs can be performed while avoiding resetting the target device 104. In the following examples, an old version of firmware 114 resides on (e.g., is programmed in) the first flash bank 112a, while a new version of firmware 116 is provided to the second flash bank 112b. However, in other examples, the reverse is also possible, and the old version of the firmware 114 resides on (e.g., is programmed in) the second flash bank 112b, while the new version of firmware 116 is provided to the first flash bank 112a. Accordingly, in some examples LFUs thus occur in a ping-pong fashion between the first flash bank 112a and the second flash bank 112b.

The CPU 106 is configured to execute a current version of firmware stored in the flash memory 112. Accordingly, the CPU 106 is also configured to execute ISRs of the current version of the firmware as needed. Interrupts can be generated by various components of the system 100. For example, interrupts can be generated by peripherals, including the communication peripheral between the host application 102 and the microcontroller/target device 104, sensing peripherals (e.g., an analog-to-digital converter (ADC), not shown in FIG. 1 for simplicity), actuating peripherals (e.g., a pulse-width modulation (PWM) functional block), and/or other functional blocks internal to the microcontroller/target device 104. The scope of this description is not limited to a particular type of interrupt; however, the interrupts are provided to the CPU 106, which services such interrupts during ISR windows, using ISR(s) of the firmware stored in the flash memory 112, as described above.

In examples of this description, the system 100 and, more specifically, the target device 104, is configured as a high-availability system that satisfies a maximum downtime threshold (e.g., the target device 104 is available, or not offline, for less than the maximum downtime threshold, such as a number of minutes per day). In various examples, the target device 104 is a telecommunications rectifier, a server PSU, and/or a microcontroller that provides functionality to various types of servers or computing devices. As described above, an LFU updates an old version of firmware 114 to a new version of firmware 116.

As described above, examples of this description enable LFUs to be implemented without having their magnitude constrained by the duration of idle windows of the target device 104 (or the high-availability system 100) between ISR windows. In particular, because the first step of the LFU switchover is the dominant step from a time/duration perspective, it is useful to free the first step from the timing constraint of needing to be performed within the idle window between ISR windows.

For example, the target device 104, which can be a microcontroller 104, implements a two-step LFU switchover process. The two-step LFU switchover takes advantage of assumption(s) that can be made regarding the initialization of variables to allow interrupts to continue to be serviced during at least a portion of the LFU switchover (e.g., during the first step, which occupies a greater duration of the overall LFU switchover process).

The CPU 106 is configured to receive the LFU command from the host 102. The CPU 106 is also configured to download or otherwise receive an image (e.g., a source file) of the new version of the firmware 116 from the host 102 (e.g., the image 208 provided by compiler 202) responsive to the LFU command.

Accordingly, in the first step of the LFU switchover process (e.g., during a first time period), the CPU 106 performs initializations (e.g., responsive to the image 208 provided by the compiler 202) that can be performed while continuing to service interrupts. For example, in the first step of the LFU switchover, the CPU 106 initializes new variables, while not altering common variables (e.g., common variables are not re-initialized). In the first step, the CPU 106 does not yet de-allocate variables not used in the new version of the firmware 116, to avoid disrupting the ability of the old version of the firmware 114 to service interrupts. The second step of the LFU switchover begins responsive to the CPU 106 completing initialization of variables in the first step.

In the second step of the LFU switchover (e.g., a second time period subsequent to the first time period), the CPU 106 performs software initializations that cannot be performed while also servicing interrupts (e.g., responsive to the image 208 provided by the compiler 202). For example, the CPU 106 updates interrupt vector tables (e.g., containing location(s) in memory the ISR(s) reside) while interrupts are disabled. Likewise, the CPU 106 updates function pointers (e.g., location(s) in flash banks 112 and/or RAM 110 the functions being pointed to reside) while interrupts are disabled. Further, the CPU 106 initializes or reinitializes stack pointer(s) while interrupts are disabled, such as to avoid running out of stack space after a number of LFUs.

Accordingly, when the second step of the LFU switchover is complete, an execution context of the old version of the firmware 114 is cleared or reset to enable an execution context of the new version of the firmware 116 to begin following the second step of the LFU switchover. Because the first step of the LFU switchover can entail multiple memory accesses, the duration of the first step scales with the number of variables to be initialized and is generally greater than the duration of the second step. For example, the first step can be on the order of 100s of cycles, while the second step can be on the order of 10s of cycles, or less than 10 cycles.

The first step of the LFU switchover can be considered to implement functionality that does not impact the ability of the old version of the firmware 114 to service interrupts. For example, the changes made during the first step are related to initializing variables for the new version of the firmware 116, and also do not alter variables used by the old version of the firmware 114, and thus do not impact the ability of the old version of the firmware 114 to service interrupts. Accordingly, during the first step of the LFU switchover, interrupts remain enabled and interrupts from the old version of the firmware 114 can thus be serviced. For example, if an interrupt occurs during the first step of the LFU switchover, the CPU 106 pauses initialization of variables while the ISR of the old version of firmware 114 executes and, upon completion of the ISR, control is transferred back to the CPU 106 and the initialization process. Because the first step does not reinitialize any common variables, the first step can occur independently of continuing to service interrupts generated by the old version of the firmware 114. Further, any new variables created (e.g., initialized) during the LFU switchover will not be accessed by ISRs of the old version of the firmware 114.

The second step of the LFU switchover changes aspects of the system context (e.g., interrupt vector tables) that would cause an ISR from the old version of the firmware 114 not to function properly. Accordingly, during the second step of the LFU switchover, interrupts are disabled (e.g., interrupts are latched) and are provided to the CPU 106 responsive to the second step being completed, and interrupts thus being re-enabled. In one example, the CPU 106 is configured to begin the second step of the LFU switchover responsive to an end of an ISR window (e.g., at the beginning of an idle window), and the second step completes prior to the end of the idle window in which the second step begins. Accordingly, an interrupt that occurs in a subsequent ISR window (e.g., that follows the idle window in which the second step begins) is serviced by the CPU 106 executing an ISR from the new, updated firmware 116. As described above, this enables LFUs to be implemented without having their magnitude constrained by the duration of idle windows present in the high-availability system 100.

Figure 3:
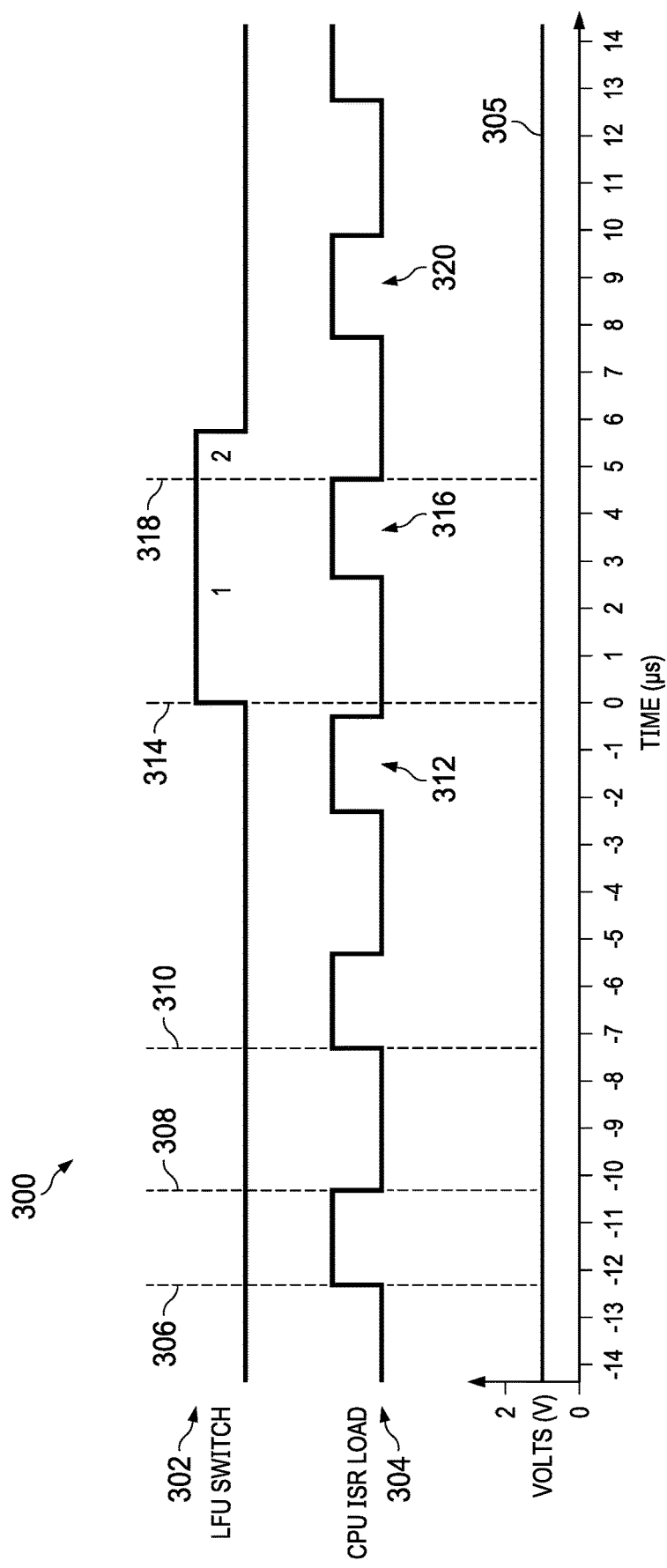
FIG. 3 is a timing diagram of a live firmware update switchover occurring during a system interrupt service routine window in accordance with various examples.

FIG. 3 is a timing diagram 300 of an LFU switchover that occurs during both a system ISR window and an idle window in accordance with various examples. The timing diagram 300 includes an LFU waveform 302 and a CPU ISR load waveform 304. The LFU waveform 302 being asserted or logic high corresponds to an LFU switchover being performed. The CPU ISR load waveform 304 being asserted or logic high corresponds to an ISR window, and thus the CPU ISR load waveform 304 being de-asserted or logic low corresponds to an idle window. The timing diagram 300 also includes an output voltage (e.g., regulated by the microcontroller/target device 104 in one example) waveform 305, which represents an output voltage of the microcontroller/target device 104 as a function of time. As demonstrated, the output voltage waveform 305 remains approximately constant through the LFU switchover process, which indicates that the LFU switchover method described herein is implemented in a way that does not impact the performance of the microcontroller/target device 104 for a given application.

As described above, in some cases, an extent or a magnitude of firmware changes (e.g., a delta or difference between an old firmware version 114 and a new firmware version 116, such as new variables to be initialized, number of new function pointers, and the like) during the LFU switchover is limited by the duration of an idle window between ISR windows (e.g., known or predetermined periods of time in which interrupts can be serviced). In the example of FIG. 3, interrupts occur at a rate of 200 kHz, or once every 5 us, with a 40% duty cycle, so the ISR can occupy 2 us of the 5 us period. For example, an ISR window begins at time 306 and lasts for approximately 2 us, ending at time 308. Accordingly, an idle window begins at time 308 and lasts for approximately 3 us (e.g., the remaining amount of the period after the 2 us allocated for the ISR), ending at time 310. At time 310, a new cycle or period begins. In some cases, the LFU switchover is constrained to (e.g., needs to be completed during) the 3 us idle window before the next interrupt could occur, and thus the magnitude of changes implemented by the LFU is constrained by the duration of the idle window.

In the example of FIG. 3, an interrupt received during ISR window 312 is serviced by an ISR from the old version of the firmware 114 (e.g., an "old ISR"). The first step of an LFU switchover begins at time 314. In this example, an LFU command is received by the CPU 106 at a time prior to the time 314, and thus the CPU 106 downloads or otherwise receives an image (e.g., a source file) of the new version of the firmware 116 from the host 102 responsive to the LFU command. An interrupt received during ISR window 316, which occurs during the first step of the LFU switchover that began at time 314, is also serviced by an ISR from the old version of the firmware 114. As described above, during the first step of the LFU switchover, interrupts remain enabled. The first step of the LFU switchover is generally greater than the duration of the second step, and so the magnitude of the LFU switchover can thus be greater because the first step of the LFU switchover can overlap multiple ISR windows, during which interrupts are serviced by an ISR from the old version of the firmware 114. That is, the LFU switchover is not limited to start and finish during a single idle window.

As described above, in one example, the CPU 106 is configured to begin the second step of the LFU switchover responsive to an end of an ISR window. Accordingly, at time 318 (e.g., after the end of ISR window 316), the second step of the LFU switchover begins. In some examples, the first step of the LFU switchover completes prior to time 318, but the second step begins during the idle window (e.g., at time 318) because aspects of the system context are changed in the second step that would cause an ISR from the old version of the firmware 114 not to function properly.

As described above, during the second step of the LFU switchover, interrupts are disabled (e.g., interrupts are latched) and are provided to the microcontroller/target device 104 responsive to the second step being completed, at which time interrupts are re-enabled. Because the second step is generally shorter in duration than the first step, the second step completes prior to the end of the idle window in which the second step begins. Accordingly, an interrupt received during ISR window 320 (e.g., after the second step of the LFU switchover completes) is serviced by an ISR from the new, updated firmware 116 (e.g., a "new ISR"). As described above, this enables LFUs to be implemented without having their magnitude constrained by the duration of the idle windows present in the high-availability system 100.

Figure 4:
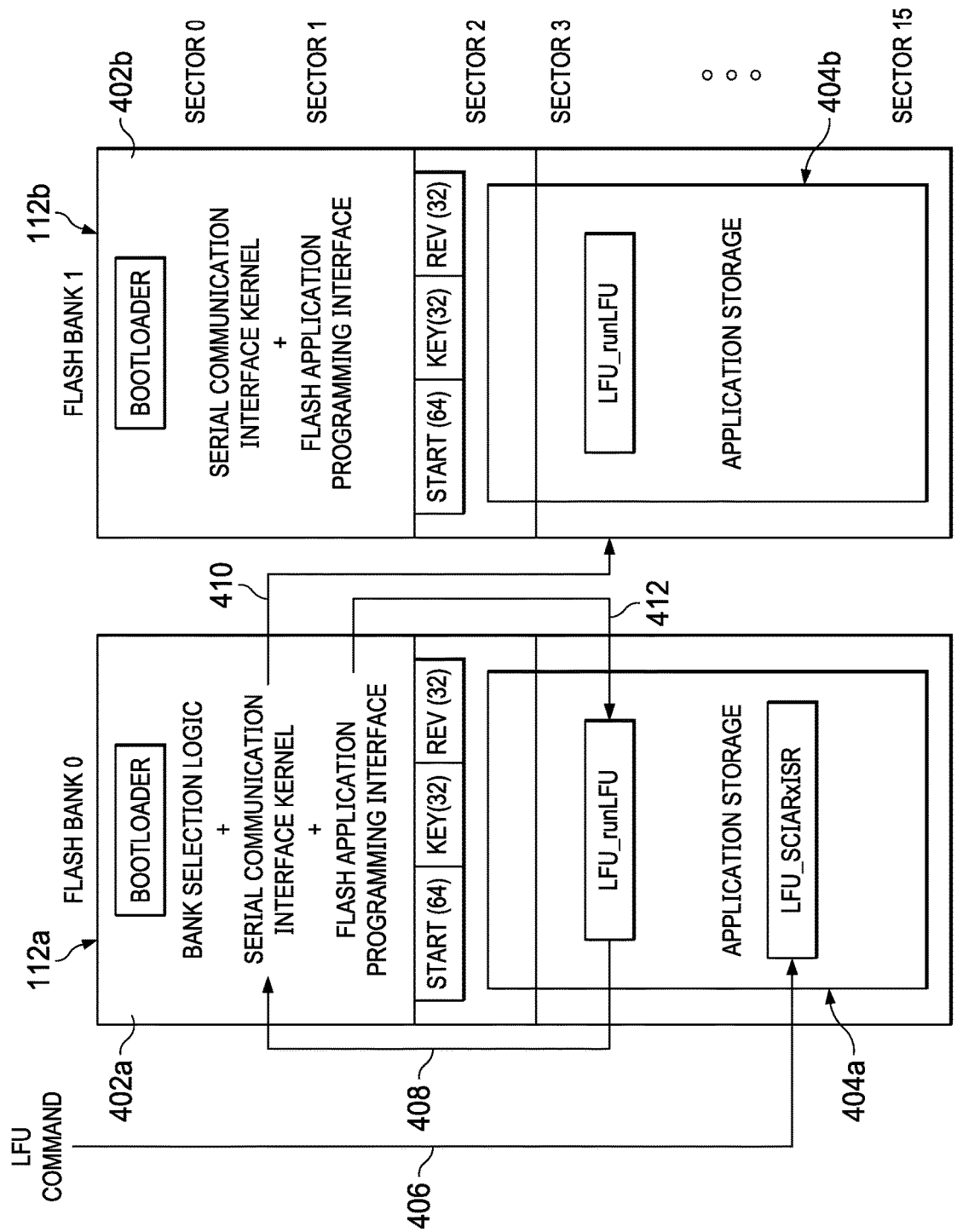
FIG. 4 is a schematic flow diagram of a live firmware update switchover using multiple flash banks of the computer system of FIG. 1 in accordance with various examples.

FIG. 4 is a schematic flow diagram 400 of an LFU using the multiple flash banks 112 of the target device 104 of FIG. 1 in accordance with various examples. FIG. 3 shows an example of the partitioning of the flash banks 112a, 112b in greater detail. In this particular example, each flash bank 112 includes a bootloader 402 (e.g., the flash bank 112a has a bootloader 402a, and the flash bank 112b has a bootloader 402b) that occupies two sectors of the flash bank 112 (e.g., sectors 0 and 1). In other examples, the bootloader 402 can occupy more or fewer sectors of the flash bank 112. Each flash bank 112 also includes application storage 404 (e.g., the flash bank 112a has application storage 404a, and the flash bank 112b has application storage 404b) that occupies some or all of the remaining sectors of the flash bank 112 (e.g., sectors 3-15 in the example of FIG. 3). In the example of FIG. 3, sector 2 contains reserved locations to store START, KEY, and REV data, which are explained further below.

The bootloader 402 of each flash bank 112 is generally configured to initially execute after a reset of the target device 104, in order to hand over control to the CPU 106 executing the current version of firmware. For example, the bootloader 402a of the first flash bank 112a includes flash bank selection logic, an SCI kernel, and one or more flash application programming interfaces (APIs). The bootloader 402b of the second flash bank 112b is similar to the bootloader 402a of the first flash bank 112a, but does not include flash bank selection logic. However, in another example, the second flash bank 112b can also include flash bank selection logic. Generally, the bootloader 402 portion of the flash banks 112 does not change during LFUs. The flash bank selection logic is configured to determine which, if any of the flash banks 112a, 112b are programmed with firmware (e.g., in the application storage 404), and, if so, which of the flash banks 112a, 112b application storage 404a, 404b contains the more recent version of the firmware. The SCI kernel is configured to implement the download of the image of new firmware from the host 102, while the flash APIs are configured to erase, program, and/or verify the respective application storage 404 with the downloaded image from the host 102.

In an example, the START data indicates that a flash erase operation is complete, and that programming of the flash (e.g., with a new downloaded firmware image) is about to begin. In an example, the REV data indicates a revision number of the firmware programmed in the application storage 404a, 404b of the respective flash bank 112a, 112b. The REV data is thus useful for the bank selection logic to determine the newer firmware version between the first flash bank 112a and the second flash bank 112b. In an example, the KEY data indicates whether the firmware programmed in the application storage 404a, 404b of the respective flash bank 112a, 112b is valid. For example, the KEY value for the first flash bank 112a being a specific (e.g., predetermined) pattern indicates the firmware programmed in the application storage 404a is valid. The KEY value for the second flash bank 112b being a value other than the specific pattern indicates the firmware programmed in the application storage 404b is not valid.

The schematic flow diagram 400 includes a first function 406, in which the LFU command is received (e.g., from the host 102). As described above, the LFU command can be received via a communications peripheral, such as an SCI or other serial interface. The LFU command indicates to the target device 104 to prepare to perform an LFU switchover. In the example of FIG. 3, the LFU command is received by the target device 104 and an SCI interrupt is generated responsive to the LFU command. The CPU 106 executes an ISR (e.g., SCIARxISR) to service the SCI interrupt, in which SCIA represents the one of multiple SCI ports over which the LFU command was received and Rx represents that the SCI interrupt corresponds to a LFU command being received. Responsive to receiving the ISR for the SCI interrupt, a command identifier flag is set.

The schematic flow diagram 400 includes a second function 408 (e.g., responsive to the first function 406), in which a background function (e.g., the runLFU function) that runs during idle windows parses the command identifier flag to determine that an LFU command has been received from the host 102. If an LFU command is not received, then the background function performs other functionality that is provided by the firmware. However, responsive to an LFU command being received, the background function of the firmware transfers control to the LFU bootloader 402a.

The schematic flow diagram 400 also includes a third function 410 (e.g., responsive to the second function 408), in which the LFU bootloader 402a downloads the new firmware image from the host 102 and programs the new firmware image in the application storage 404b of the second flash bank 112b. That is, the bootloader 402a of the flash bank on which the current (e.g., soon-to-be prior, or old) firmware is executing (e.g., the first flash bank 112a) programs the new firmware image in the application storage of the other flash bank (e.g., application storage 404b of the second flash bank 112b).

The schematic flow diagram 400 further includes a fourth function 412 (e.g., responsive to the third function 410), in which the LFU bootloader 402a transfers control back to the firmware executing on the first flash bank 112a. Accordingly, the functions 406, 408, 410, 412 prepare the flash banks 112a, 112b for the LFU switchover, and thus occur prior to the LFU switchover.

FIG. 5 is a flow diagram of a method 500 to prepare for an LFU in accordance with various examples. In some examples, the method 500 is performed or otherwise implemented by a hardware processor (e.g., CPU 106) executing firmware or software (e.g., stored on a non-transitory computer-readable medium, such as RAM 110 and/or flash banks 112) that causes the hardware processor to provide such functionality. In an example, the method 500 is carried out by the hardware processor responsive to executing instructions of such firmware or software.

The method 500 begins in block 502 with the execution of a reset vector. For example, the reset vector is an initial portion of software or firmware that is executed following a reset of the target device 104. The method 500 then continues to block 504 in which the bank selection logic (e.g., of one of the bootloaders 402) determines which of the flash banks 112a, 112b are programmed with a more recent version of the firmware. For example, as described above, the REV data of each flash bank 112a, 112b indicates a revision number of the firmware programmed in the application storage 404a, 404b of the respective flash bank 112a, 112b. The REV data is thus useful for the bank selection logic to determine the newer firmware version between the first flash bank 112a and the second flash bank 112b.

Control is then passed to the newer firmware version between the first flash bank 112a and the second flash bank 112b. For example, if the bank selection logic determines in block 504 that the application storage 404a of the first flash bank 112a contains the newer version of the firmware, the method 500 continues to block 506 and the firmware in the application storage 404a is executed. As described above, while the firmware executes, a background function (e.g., a loop of lower-priority functions) executes during idle windows. The method 500 continues to block 508 responsive to receiving an LFU command from the host 102 in block 506. In block 508, the background function transfers control to the LFU bootloader 402a, which programs the new version of firmware in the application storage of the other flash bank (e.g., application storage 404b of the second flash bank 112b). The method 500 then continues to block 510 responsive to the switchover to the new version of firmware being complete. In block 510, the new version of the firmware in the application storage 404b is executed.

Alternately, referring back to block 504, if the bank selection logic determines in block 504 that the application storage 404b of the second flash bank 112b contains the newer version of firmware, the method 500 continues to block 510 and the firmware in the application storage 404b is executed. As described above, while the firmware executes, a background function (e.g., a loop of lower-priority functions) executes during idle windows. The method 500 thus continues to block 512 responsive to receiving an LFU command from the host 102 in block 510. In block 512, the background function transfers control to the LFU bootloader 402b, which programs the new version of firmware in the application storage of the other flash bank (e.g., application storage 404a of the first flash bank 112a). The method 500 then continues to block 506 responsive to the switchover to the new version of firmware being complete. In block 506, as described above, the new version of the firmware in the application storage 404a is executed. Accordingly, in some examples LFUs thus occur in a ping-pong fashion between the first flash bank 112a and the second flash bank 112b.

Referring again to blocks 506 and 510, a device reset command can be received, which causes the method 500 to revert to block 502. The reset vector is executed in block 502, and the method 500 proceeds as described above.

FIG. 6 is a flow diagram of a method 600 for an LFU switchover in accordance with various examples. In some examples, the method 600 is performed or otherwise implemented by a hardware processor (e.g., CPU 106) executing firmware or software (e.g., stored on a non-transitory computer-readable medium, such as RAM 110 and/or flash banks 112) that causes the hardware processor to provide such functionality. In an example, the method 600 is carried out by the hardware processor responsive to executing instructions of such firmware or software. The method 600 begins in block 602 with receiving, by a microcontroller, a LFU command from an external host. For example, as described above, the microcontroller/target device 104 receives a LFU command from the host application 102.

The method 600 continues in block 604 with downloading, by the microcontroller, an image of a new version of firmware responsive to the LFU command. As described above, the CPU 106 of the microcontroller/target device 104 is configured to download or otherwise receive an image (e.g., a source file) of the new version of the firmware 116 from the host 102 responsive to the LFU command.

As described above, the compiler 202 provides the image of the new version of the firmware 116 responsive to a comparison of the new version with an old version of the firmware. For example, a compiler of the CPU 106 is provided with an image of the old version of the firmware (e.g., from a prior update) 114 as a reference, and in addition to the source file(s) of the new version of the firmware 116. Accordingly, the compiler of the CPU 106 is able to identify commonalities (e.g., common data variables), as well as differences (e.g., new data variables), between the old version of the firmware 114 and the new version of the firmware 116 specified in the image(s) or source file(s), and provides the image of the new version of the firmware 116 that reflects these commonalities and differences.

The method 600 then continues in block 606, which occurs during a first time period. In block 606, the method 600 includes initializing only variables contained in the new version that are not contained in the old version. As described above, in the first step of the LFU switchover process (e.g., during the first time period), the CPU 106 performs initializations that can be performed while continuing to service interrupts. For example, in the first step of the LFU switchover, the CPU 106 initializes new variables, while not altering common variables (e.g., common variables are not re-initialized). In the first step, the CPU 106 does not yet de-allocate variables not used in the new version of the firmware 116, to avoid disrupting the ability of the old version of the firmware 114 to service interrupts.

The first step of the LFU switchover (e.g., block 606) implements functionality that does not impact the ability of the old version of the firmware 114 to service interrupts. Accordingly, during the first step of the LFU switchover, interrupts remain enabled and interrupts from the old version of the firmware 114 can thus be serviced.

The method 600 continues in block 608, which occurs during a second time period (e.g., after the first time period). In block 608, the method includes updating one or more of an interrupt vector table, a function pointer, and/or a stack pointer responsive to the new version. The second step of the LFU switchover (e.g., during the second time period) begins responsive to the CPU 106 completing initialization of variables in the first step. In the second step of the LFU switchover, the CPU 106 performs software initializations that cannot be performed while also servicing interrupts. For example, the CPU 106 updates interrupt vector tables while interrupts are disabled. Likewise, the CPU 106 updates function pointers while interrupts are disabled. Further, the CPU 106 initializes or reinitializes stack pointer(s) while interrupts are disabled, such as to avoid running out of stack space after a number of LFUs.

The second step of the LFU switchover (e.g., block 608) changes aspects of the system context (e.g., interrupt vector tables) that would cause an ISR from the old version of the firmware 114 not to function properly. During the second step of the LFU switchover, interrupts are disabled (e.g., interrupts are latched) and are provided to the CPU 106 responsive to the second step being completed, and interrupts thus being re-enabled. Accordingly, an interrupt that occurs in a subsequent ISR window (e.g., that follows the idle window in which the second step begins) is serviced by the CPU 106 executing an ISR from the new, updated firmware 116.

Accordingly, when the second step of the LFU switchover is complete, an execution context of the old version of the firmware 114 is cleared or reset to enable an execution context of the new version of the firmware 116 to begin following the second step of the LFU switchover. As described above, this enables LFUs to be implemented without having their magnitude constrained by the duration of idle windows present in the high-availability system 100.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

What is claimed is:

1. A method, comprising:
receiving, by a microcontroller, a live firmware update (LFU) command from an external host;
downloading, by the microcontroller, an image of a new version of firmware responsive to the LFU command;
during a first time period, initializing only variables contained in the new version that are not contained in an old version of firmware; and
during a second time period, updating one or more of an interrupt vector table, a function pointer, and/or a stack pointer responsive to the new version,
wherein the second time period begins responsive to completing initialization of the variables.

2. The method of claim 1, wherein system interrupts are enabled during the first time period, and disabled during the second time period.

3. The method of claim 2, further comprising:
receiving a system interrupt during the first time period;
pausing initialization of the variables responsive to receiving the system interrupt;
servicing the system interrupt with an interrupt service routine of the old version of firmware; and
resuming initialization of the variables responsive to completing servicing of the system interrupt.

4. The method of claim 2, further comprising:
receiving a system interrupt during the second time period;
latching the system interrupt; and
servicing the system interrupt with an interrupt service routine of the new version of firmware responsive to completing the update during the second time period.

5. The method of claim 1, wherein a duration of the first time period is greater than a duration of an idle window between system interrupt service routine windows.

6. The method of claim 1, wherein a duration of the second time period is less than a duration of an idle window between system interrupt service routine windows.

7. The method of claim 1, wherein the LFU command is received over a serial communications interface (SCI) channel.

8. A device, comprising:
a memory configured to store instructions; and
a processor coupled to the memory and configured to execute the instructions to cause the device to be configured to:
receive a live firmware update (LFU) command from an external host;
download an image of a new version of firmware responsive to the LFU command;
during a first time period, initialize only variables contained in the new version that are not contained in an old version of firmware; and
during a second time period, update one or more of an interrupt vector table, a function pointer, and/or a stack pointer responsive to the new version,
wherein the second time period begins responsive to completing initialization of the variables.

9. The device of claim 8, wherein system interrupts are enabled during the first time period, and disabled during the second time period.

10. The device of claim 9, wherein the processor is configured to executing the instructions to cause the device to be configured to:
receive a system interrupt during the first time period;
pause initialization of the variables responsive to receiving the system interrupt;
service the system interrupt with an interrupt service routine of the old version of firmware; and
resume initialization of the variables responsive to completing servicing of the system interrupt.

11. The device of claim 9, wherein the processor is configured to executing the instructions to cause the device to be configured to:
receive a system interrupt during the second time period;
latch the system interrupt; and
service the system interrupt with an interrupt service routine of the new version of firmware responsive to completing the update during the second time period.

12. The device of claim 8, wherein a duration of the first time period is greater than a duration of an idle window between system interrupt service routine windows.

13. The device of claim 8, wherein a duration of the second time period is less than a duration of an idle window between system interrupt service routine windows.

14. The device of claim 8, wherein the LFU command is received over a serial communications interface (SCI) channel.

15. A device, comprising:
a processor;
a first flash memory coupled to the processor, the first flash memory including a first application storage portion configured to store a first version of firmware; and
a second flash memory coupled to the processor, the second flash memory including a second application storage portion;
wherein the processor is configured to:
receive a live firmware update (LFU) command from an external host;
download an image of a second version of firmware responsive to the LFU command, wherein the second version is newer than the first version;
during a first time period, initialize only variables contained in the second version that are not contained in the first version;
during a second time period, update one or more of an interrupt vector table, a function pointer, and/or a stack pointer responsive to the second version; and
program the second application storage portion with the second version of firmware, responsive to the first application storage portion storing the first version of firmware;
wherein the second time period begins responsive to completing initialization of the variables.

16. The device of claim 15, wherein system interrupts are enabled during the first time period, and disabled during the second time period.

17. The device of claim 16, wherein the processor is configured to:
receive a system interrupt during the first time period;
pause initialization of the variables responsive to receiving the system interrupt;
service the system interrupt with an interrupt service routine of the first version of firmware; and
resume initialization of the variables responsive to completing servicing of the system interrupt.

18. The device of claim 16, wherein the processor is configured to:
receive a system interrupt during the second time period;
latch the system interrupt; and
service the system interrupt with an interrupt service routine of the second version of firmware responsive to completing the update during the second time period.

19. The device of claim 15, wherein the LFU command is a first LFU command, and wherein the processor is configured to:
- receive a second LFU command from the external host;
- download an image of a third version of firmware responsive to the second LFU command, wherein the third version is newer than the second version;
- during a third time period, initialize only variables contained in the third version that are not contained in the second version;
- during a fourth time period, update one or more of an interrupt vector table, a function pointer, and/or a stack pointer responsive to the third version; and
- program the first application storage portion with the third version of firmware, responsive to the second application storage portion storing the second version of firmware;
- wherein the fourth time period begins responsive to completing initialization of the variables in the third time period.

20. The device of claim 19, wherein system interrupts are enabled during the third time period, and disabled during the fourth time period.

* * * * *